H. L. & J. M. PETERSON & A. O. RETRUM.
STORAGE BATTERY.
APPLICATION FILED FEB. 7, 1911. RENEWED NOV. 17, 1911.
1,012,908.
Patented Dec. 26, 1911.
2 SHEETS—SHEET 1.
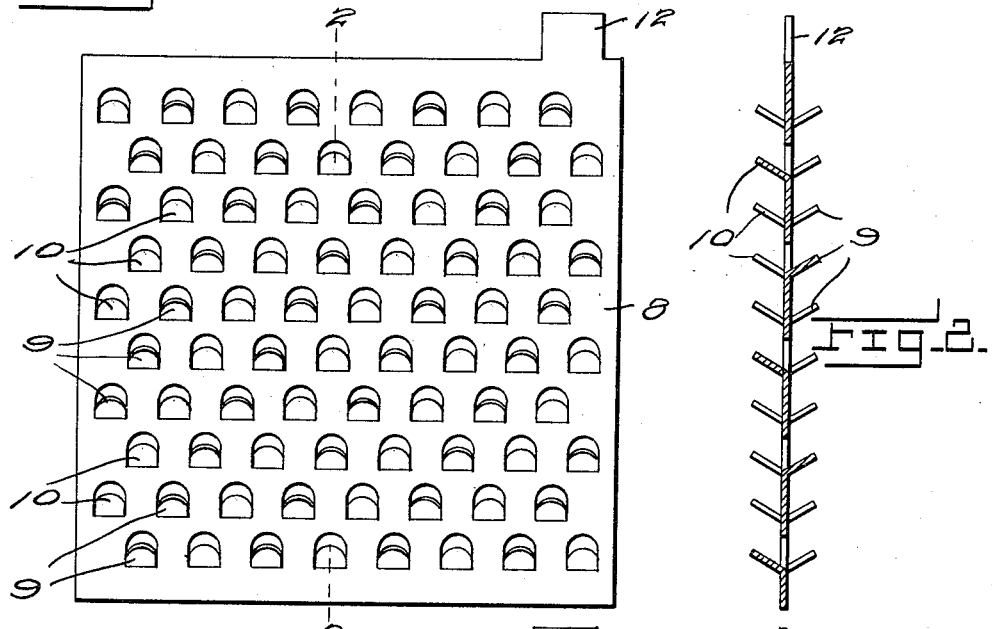
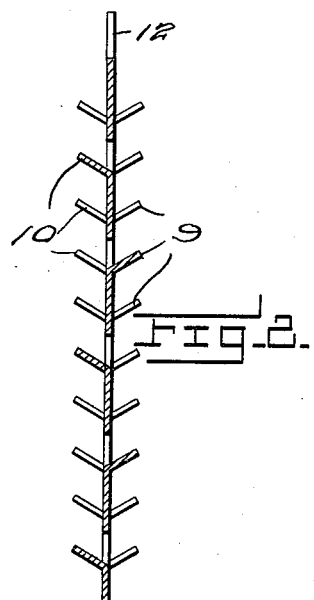
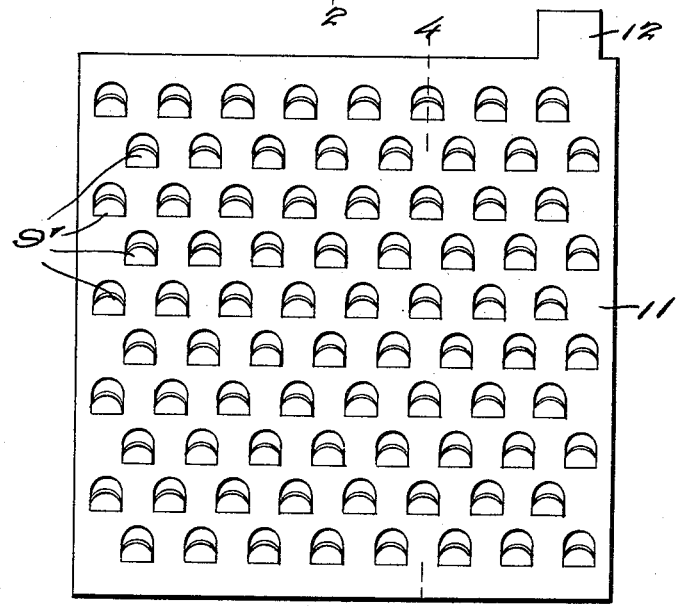
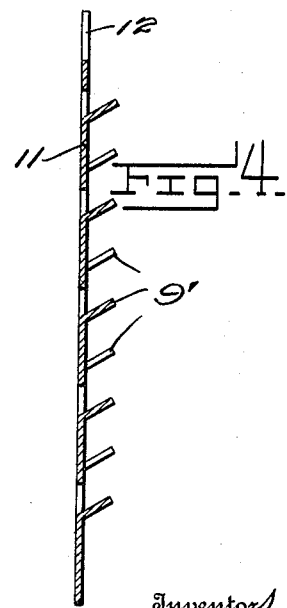
Witnesses
Inventors
J. M. Peterson,
H. L. Peterson &
A. O. Retrum,
By Harry E. Chandlee
Attorney

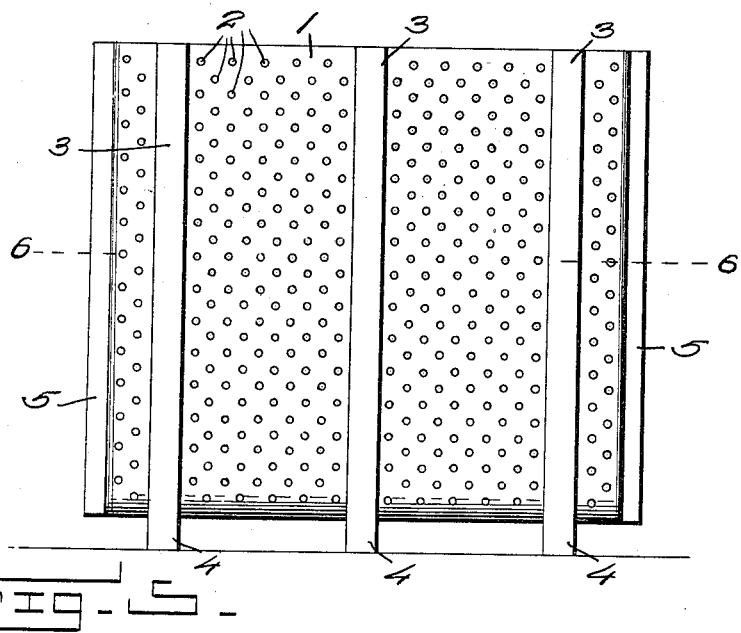
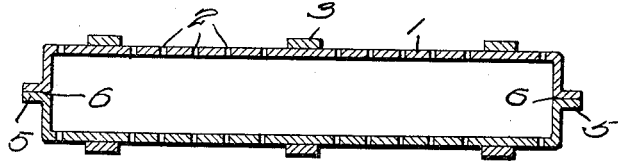
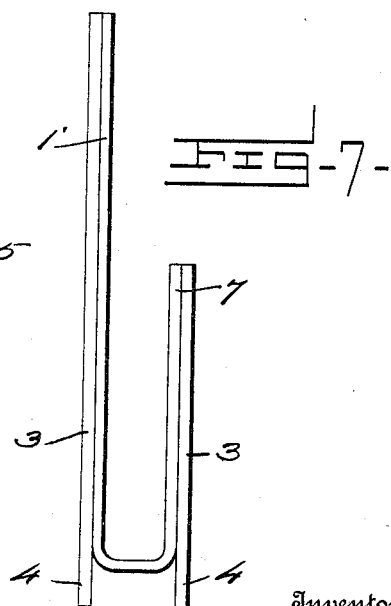

UNITED STATES PATENT OFFICE.

HENRY L. PETERSON, OF CHARLES CITY, IOWA, AND JOHN M. PETERSON AND ALVIN O. RETRUM, OF DAWSON, MINNESOTA.

STORAGE BATTERY.

1,012,908.      Specification of Letters Patent.      Patented Dec. 26, 1911.

Application filed February 7, 1911, Serial No. 607,056. Renewed November 17, 1911. Serial No. 660,966.

*To all whom it may concern:*

Be it known that we, HENRY L. PETERSON, residing at Charles City, in the county of Floyd and State of Iowa, and JOHN M. PETERSON and ALVIN O. RETRUM, residing at Dawson, in the county of Lac Qui Parle and State of Minnesota, citizens of the United States, have invented certain new and useful Improvements in Storage Batteries, of which the following is a specification.

This invention relates to improvements in storage cells and has for one of its objects to provide a separator plate of such construction that the active material is more evenly distributed and supported against the plates to prevent the same settling and packing.

Another object is to provide a protector in the form of an envelop for the plates.

Other objects and advantages will be apparent from the following description and with particular reference to the accompanying drawings, it being understood that changes in the specific structure shown and described may be made within the scope of the claim without departing from the spirit of the invention.

In the accompanying drawings: Figure 1 is a front elevation of one of the inside positive plates. Fig. 2 is a vertical section on the line 2—2 of Fig. 1. Fig. 3 is a front elevation of one of the outside negative plates. Fig. 4 is a vertical section on the line 4—4 of Fig. 3, Fig. 5 is a front elevation of the envelop for the positive plates, Fig. 6 is a transverse section on the line 6—6 of Fig. 5. Fig. 7 is an end elevation of one of the negative plate envelops.

Referring particularly to the drawings, 1 represents the envelop adapted to contain the positive plates, and which is composed of acid proof material such as celluloid, fiberloid or other similar substance. This envelop is bent into U-shaped formation and is perforated as at 2 to permit the entrance of the exciting fluid of the cell. On either side of the envelop are vertically arranged separator ribs 3 which may be formed integrally with the envelop or cemented thereon, and which extend below the bottom of the envelop to provide the supporting legs 4. The positive plates which will be later described are placed in this envelop and the vertical ends 5 of the envelop brought together and cemented as at 6 in Fig. 6.

The envelop 1' for the outside negative plates are formed of the same material and of similar construction to the one just described except that the vertical portion 7 extends only a short distance upward and parallel to the other side. This envelop is also formed with the separator ribs and supporting legs. The positive plates 8 which are formed of any suitable proportions of litharge and minium or massicot are provided with the U-shaped struck up portions 9, extending outwardly from the plate on one side and the similarly shaped portions 10 extending outwardly from the opposite side of the plate. These struck up portions are arranged in diagonal lines so that the active material placed in the envelop above described will be supported over a greater area on both sides of the plate than would be the case were the portions struck up in vertical and horizontal lines as shown in the patent to MacDougall, number 537,474 issued April 16, 1895. In this construction there exist vertical lines of open spaces between the vertical lines of the struck up portions which would permit the active material to become loosened and settle down and pack in the lower portion of the envelop, thus materially decreasing the effectiveness of the material. In the present application there does not exist vertical open spaces.

The outer or negative plate 11 has the struck up portions 9' extending only from one face, and in positioning this plate in a cell, the struck up portions are directed inwardly toward the center of the cell and toward the positive plate. Each of the positive and negative plates is wrapped in a very thin acid proof tissue such as paper. The plates are also provided with the terminal lugs 12.

The sealing up of the vertical edges of the envelop prevents any short circuiting in the cell, and also should the plates buckle, the edges would not come together. The sealing up of the plates in the acid proof tissue prevents the escape of the active material so that the same is always spread approximately over the entire surface of the plate to be acted on by the excitant fluid.

The form of cell illustrated shows the use of three plates, the inner positive and the two outer negative, but it will be understood that should a greater number of plates be used, that is several negative plates used within the cell, the struck up portions, would be made to extend on the opposite sides of the plates as is shown on the positive plate. The ribs on the envelops suitably space the same apart so that there is no possibility of them coming in direct contact thus forming a proper circulation of the excitant fluid, therethrough and permitting the ready access through the perforations of the envelop to attack the plates.

From the foregoing it will be readily seen that we have provided a simple and effective storage cell, one within which the active material is prevented settling and packing in the lower part of the cell, said material being supported more evenly over the entire face of the plates, furthermore the acid proof envelops and tissue holds the active material from escaping into the cell container.

What is claimed is:

A storage cell including a container, acid proof envelops in said container, said envelops being formed of a single sheet of perforated material and bent into U-form, ribs on the outer face of said envelops extending therebelow to form supporting feet, plates having diagonal series of struck up portions, each alternate series projecting from one side of the plate and each other alternate series projecting from the opposite side of the plate, said plates being wrapped in acid proof tissue and adapted to contain active material, said plates being positioned in said envelop, said envelops having their vertical end edges brought together and sealed, said envelops adapted to contain positive plates, and envelops to support negative plates, said last named envelops being formed of a single sheet of perforated acid proof material and bent to U-form, one of the arms of said U being shorter than the other one.

In testimony whereof I affix my signature, in presence of two witnesses.

HENRY L. PETERSON.

Witnesses:
   M. W. ELLIS,
   G. M. WEDTKE.

In testimony whereof we affix our signatures in the presence of two witnesses.

JOHN M. PETERSON.
ALVIN O. RETRUM.

Witnesses:
   LEWIS PETERSON,
   C. E. RETRUM.